United States Patent [19]

Wupper

[11] Patent Number: 4,699,435
[45] Date of Patent: Oct. 13, 1987

[54] CIRCUIT ARRANGEMENT FOR MONITORING AND CONTROLLING THE PRESSURE IN THE AUXILIARY PRESSURE SUPPLY SYSTEM OF A HYDRAULIC MOTOR VEHICLE BRAKE ARRANGEMENT

[75] Inventor: Hans Wupper, Friedrichsdorf, Fed. Rep. of Germany

[73] Assignee: Alfred Teves GmbH, Frankfurt am Main, Fed. Rep. of Germany

[21] Appl. No.: 803,426

[22] Filed: Dec. 2, 1985

[30] Foreign Application Priority Data

Dec. 6, 1984 [DE] Fed. Rep. of Germany ....... 3444458

[51] Int. Cl.[4] .............................................. B60T 17/18
[52] U.S. Cl. ...................................... 303/11; 303/6.1; 303/65
[58] Field of Search ................ 180/281; 303/1, 2, 6.1, 303/11, 18, 59, 60, 64, 65

[56] References Cited

U.S. PATENT DOCUMENTS 1,448,469 3/1923 Steinkeller ............................ 303/65
3,549,207 12/1970 Hayes ................................... 303/6.1

Primary Examiner—Duane A. Reger
Attorney, Agent, or Firm—James B. Raden; Robert P. Seitter

[57] ABSTRACT

To monitor and control the pressure in the auxiliary pressure supply system of a hydraulic motor vehicle brake system, a circuit arrangement is employed which is provided with a door-contact switch (24) which closes when the driver's door of the motor car is opened and which at a pressure in the auxiliary pressure supply system (11-16) below the telltale threshold activates the hydraulic pump (11) irrespective of the activation of the ignition. Moreover, a holding circuit (25, 26, 30, D30) is provided through which, after closure of the driver's door, the hydraulic pump (11) continues to operate until the telltale pressure threshold or responding threshold is reached or exceeded.

7 Claims, 1 Drawing Figure

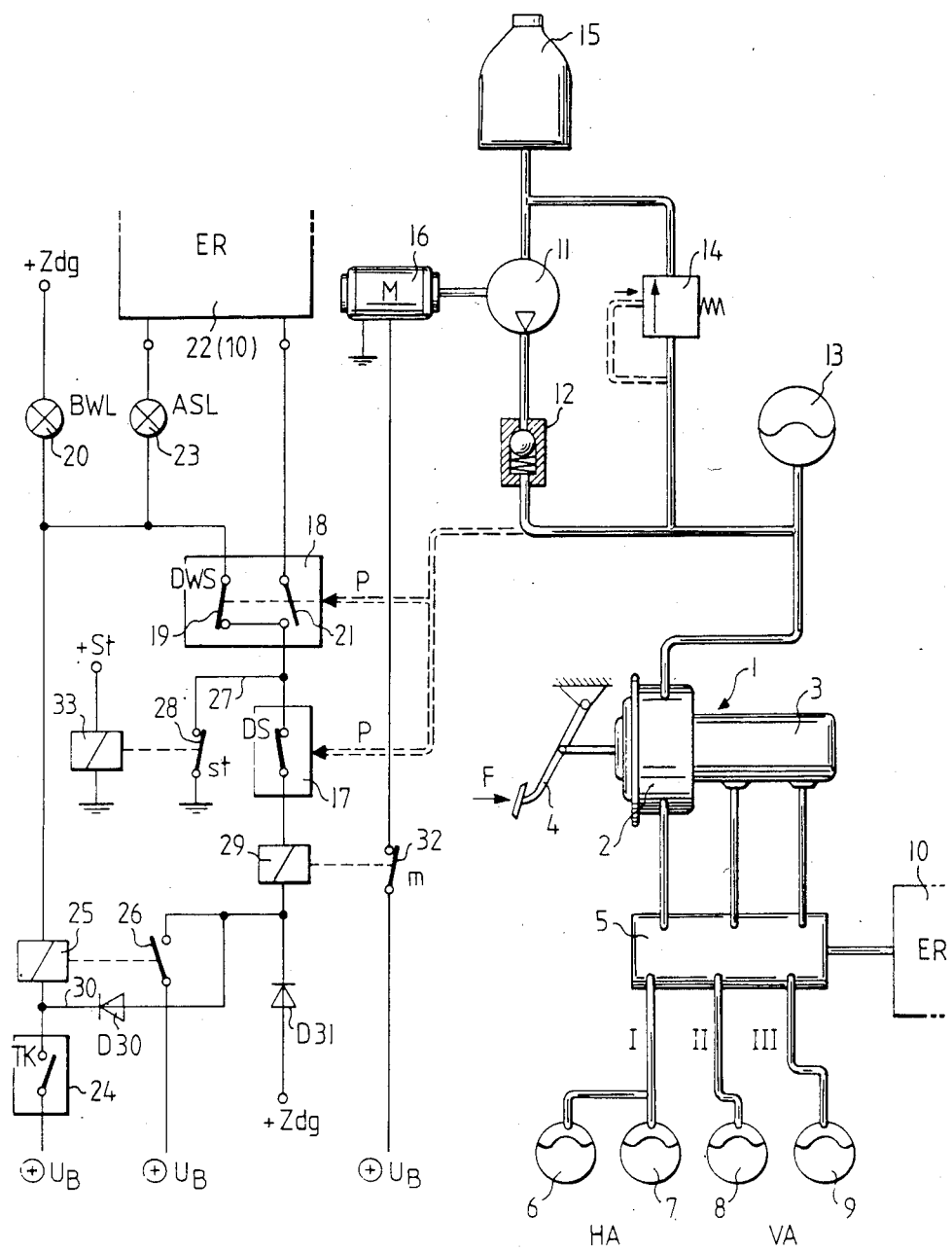

CIRCUIT ARRANGEMENT FOR MONITORING AND CONTROLLING THE PRESSURE IN THE AUXILIARY PRESSURE SUPPLY SYSTEM OF A HYDRAULIC MOTOR VEHICLE BRAKE ARRANGEMENT

BACKGROUND OF THE INVENTION

The present invention relates to a circuit arrangement for monitoring and controlling the pressure in the auxiliary pressure supply system of a hydraulic motor vehicle brake arrangement furnished with a pressure accumulator and a hydraulic pump driven by electromotive force. The circuit is activated and deactivated responsive to pressure and is provided with a pressure telltale circuit indicating a decrease in the auxiliary pressure below a predetermined pressure threshold lower than the operating pressure range.

Conventional skid-controlled and non-controlled hydraulic brake systems and brake force boosters of motor vehicles are furnished with an auxiliary pressure supply system including a hydraulic reservoir permanently kept at a high pressure level in order that (with the brakes applied) auxiliary energy can immediately be fed to the brake system by way of the high-pressurized hydraulic fluid. With the aid of a hydraulic pump driven by electromotive force duly activated and deactivated by a pressure switch, the pressure level in the hydraulic reservoir is held within predetermined pressure limit values—i.e., within the operating pressure range. In addition, for safety reasons, a pressure telltale circuit is provided responding to a drop in the pressure level below a predetermined threshold, releasing a warning signal. In the event of a skid-controlled brake system, it turns off the control in whole or part. The telltale threshold preferably is below the operating pressure range in order to release a warning signal only if a defective condition prevails rather than if the pressure approaches the lower limit of the operating pressure range critical of an activation of the hydraulic pump.

With the ignition disconnected and the motor vehicle in the parking position, conventionally, the circuit to the driving motor of the hydraulic pump is discontinued. There is no reloading of the accumulator. As a result of unavoidable valve leakages caused by the permeation of the filling gap through the resilient membrane of standard-type accumulators, which, although relatively low, cannot be entirely eliminated, and also as a result of leakage caused by other weak points, the pressure in the reservoir and in the auxiliary pressure supply system, respectively, will decrease and at least during extended periods of motor vehicle standstill, will drop to below the telltale pressure threshold. High temperatures, unfavorable manufacturing tolerances or wear of the valves will accelerate the pressure drop. Optionally, the pressure can be deliberately decreased during standstill of the motor car, with the aid of auxiliary equipment. The driver, after an extended or even after a short-term standstill of the motor car, is forced afer starting of the motor or activating the ignition to allow for an answering interval and to start off only after he has been notified of the operating pressure in the supply system and, hence, after a proper operating condition of the brake system has been reached.

It is, therefore, the object of the present invention to overcome this disadvantage and to permit an immediate takeoff after starting of the motor after an extended motor car standstill or, at least, reduce the answering interval until disappearance of the warning signal to a period of time considered acceptable. A reduction of the leakages through structurally more complex components should be avoided for cost-saving reasons, especially so as such measures at adverse conditions, such as high temperatures and extended answering intervals, would not bring about the desired result.

SUMMARY OF THE INVENTION

It has been found that this problem can be solved in a simple and technically progressive manner by a circuit arrangement of the described type, the special features of which reside in that same comprises a door-contact switch which closes upon opening of the driver's door of the motor car and which in the event of a pressure in the auxiliary pressure supply system below the telltale threshold, will put the hydraulic pump into operation irrespective of the activation of the ignition and of the position of the ignition switch.

Loading of the accumulator, hence, is initiated by the circuit arrangement of the invention or an additional circuit in a very simple manner (if the pressure level has decreased below the telltale pressure threshold) at a date early enough as to safeguard that adequate pressure is available in the supply system of the brake arrangement immediately upon or shortly after starting the motor vehicle. This also applies if the pressure had decreased beforehand to a high degree because, as a rule, a considerable period of time lapses sufficient for adequately loading the accumulator, also at adverse condition, between opening of the driver's door and starting of the motor, especially so if, in the meanwhile, the safety belt is duly applied.

According to a preferred form of embodiment of the invention, the door contact activates a motor starting relay directly or by way of an auxiliary relay, which starting relay is connected in series with the pressure switch that, in the operating condition, activates and deactivates the hydraulic pump in response to the prevailing pressure. The door contact can be connected in series with a contact of the telltale pressure circuit when the pressure drops below the telltale pressure threshold. The relays employed can electromagnetic components or electronic circuits.

Another embodiment of the invention that the circuit arrangement comprises a holding circuit by way of which, after closure of the driver's door, the hydraulic pump can be maintained in operating condition until a predetermined switch threshold has been reached. The hydraulic pump, preferably remains activated until the telltale pressure threshold or a predetermined pressure level within the operating pressure range has been reached.

The holding circuit according to a preferred form of embodiment of the invention, substantially comprises an auxiliary relay connected in series with the door contact, including a working contact connected in parallel to the door contact by way of which (after energizing and reswitching of the auxiliary relay) the motor starting relay can be activated and, moreover, comprises a holding current path.

Furthermore, according to another embodiment of the invention, a holding circuit is provided comprising a timer unit within the monitoring and controlling circuit which is operated by opening or closing the driver's door, by way of which holding circuit, the hydraulic pump remains activated for a predetermined period of time as long as the hydraulic pressure is below the maximum operating pressure of the supply system irrespective of the door switch.

Finally, the circuit arrangement of the invention can be provided with a switch discontinuing the activation of the hydraulic pump during operation of the starter in order that the entire battery capacity be available for the start-up operation. For this purpose, also switch contact can be used which, in actual practice, are nevertheless provided for the short-term switch-off of some users during the start-up operation.

BRIEF DESCRIPTION OF THE DRAWING

Various objects, features and attendant advantages of the present invention will be more fully understood from the following description of further details and one form of embodiment when read in connection with the accompanying drawing wherein the single FIGURE schematically illustrates one circuit arrangement according to the present invention is conjunction with a skid-controlled hydraulic brake system.

DETAILED DESCRIPTION

In the drawing, a triple-circuit brake system including a hydraulic brake force booster and a skid-control are symbolically illustrated. A pedal-operated brake pressure generator 1, in this example, comprises a hydraulic brake force booster 2 which, structurally, is combined with a tandem master cylinder 3. In a brake circuit, namely brake circuit I, the brake pressure is varied by way of a control valve (not shown) disposed in the interior of the booster 2 is proportion to the force F applied to brake pedal 4. The controlled pressure, moreover, is transferred by way of the master cylinder 3 to two hydraulically separate static circuits II, III.

Provided between the outputs of the brake pressure generator 1 and the wheel brakes 6 to 9 is a brake pressure modulator 5 composed, for example, of electromagnetically controllable 2/2-way valves by way of which, with the aid of an electronic control (ER) 10, the brake pressure path in the wheel brakes and, hence, the wheel skid, can be influenced in the desired manner. Connected to brake circuit I are the wheels of the rear axle HA, while the wheels of the front axle VA are connected to circuits II, III such that the brake pressure in the wheel brakes 6, 7 of the rear wheels can be controlled jointly, whereas in the front wheel brakes 8, 9 it can be controlled individually.

The auxiliary energy supply system of the brake arrangement as shown substantially comprises a hydraulic pump 11 including the associated check valve 12, a hydraulic reservoir 13 and a pressure limiting valve 14 responding to an excess pressure liable to build up as a result of a defective condition in the pressure control. Moreover, a pressure compensating and supply reservoir 15 is provided which is connected to the intake side of pump 11.

Hydraulic pump 11 is driven by an electromotor 16 activated by means of a pressure switch (DS) 17 as soon as the pressure in the afore-described auxiliary pressure supply system (11–16) reaches or drops below the lower limit value of the predetermined operating pressure range, and deactivated as soon as the reservoir 13 is loaded to the upper operating pressure limit value.

A second pressure-responsive switch 18, which is provided as a telltale pressure switch (DWS), will respond as soon as the pressure in the supply system has reached a telltale pressure threshold. The threshold is lower than the lower limit value of the operating pressure at which motor 16 is activated by pressure switch 17. The response of DWS 18, during operation, hence, an indication that there is a defective condition for which reason a brake telltale telltale lamp (BWL) 20 will illuminate by way of contact 19 closed at an excessively low pressure p, provided, however, that the ignition (terminal="+Zdg") is activated. The rise in pressure p beyond the telltale threshold is indicated by way of a second contact 21 of DWS 18 by closure of contact 21 of the logic circuit 22 in communication with the electronic control 10 or forming a component part thereof. Failure, if any, of the skid control is indicated by a light 23 (antiskid lamp).

What is essential of the operation of the circuit arrangement of the present invention is a door contact (TK) 24, providing a working contact disposed on the driver's door of the vehicle. A holding relay 25 in communication with a working contact 26 is equally important for the function of the door contact activating circuit. The mode of operation of the door contact 24 and of the rest of the circuit components required for the circuit arrangement for monitoring and controlling the pressure in the auxiliary pressure supply system of the brake arrangement as provided by the invention, will be provided in the following description of the mode of operation of the said circuit.

When the driver's door is opened, the door contact 24 closes thereby activating motor 16 although the ignition is deactivated so that no voltage is applied to the +Zdg terminals, if at the time when the door is opened, the pressure p in the reservoir 13 is below the telltale pressure threshold so that the pressure telltale switch 18 and the contact 19, respectively, are in the switch position as shown. For, after closure of contact 24, a current path is formed from the current source and in the example as shown, from the positive pole $+U_3$ of the motor vehicle battery by way of contact 24, relay 25, contact 19, current path 27 and break-circuit 28 to ground. By energizing relay 25, work contact 26 thereof is closed thereby causing the motor activating relay 29 to pull up. Pressure switch 17, in that phase, is anyway closed because the pressure not only is below the minimum operating pressure but even below the telltale pressure threshold.

After closing the driver's door which results in an opening of the door contact 24, the relay 25, by way of work contact 26 continuing to be closed, and the holding current path 30, with a diode D30, is held in the pulled-up position. Diode D30 prevents a response of the motor activating relay 29 when contact 19 is opened—i.e., at a reservoir pressure above the telltale threshold but below the activating pressure of operation. A relatively high-ohmic resistor could take over the function of the diode 30 because, in standard-type relays, the holding current is substantially lower than the current required for pull-up.

If the telltale pressure threshold is exceeded, the DWS 18 switch will respond causing the contact 19 to open and relay 25 to release.

After activation of the ignition the battery voltage is applied to terminals +Zdg and the brake warning lamp BWL 20 will light up pending response of DWS 18. As long as pressure p in reservoir 13 is below the reswitch pressure of the pressure switch 17, the motor activating relay 29, by way of diode D31, is connected to the supply source (i.e., by way of terminal +Zdg) thereby maintaining, by way of work contact 32 of relay 29, the activated condition of the driving motor 16 even after a pressure rise beyond the telltale pressure threshold upon opening of contact 19, release of relay 25 and opening of holding contact 26.

According to the illustrated embodiment of the present invention, current path 17, during the starting operation, is interrupted by means of a starter relay 33 carrying the break-circuit contact 28 and being energizable by way of a starter terminal +St thereby temporarily deactivating relay 29, and by way of work contact 32 thereof, the driving motor 16 and, hence, the hydraulic pump 11. During starting, hence, the full capacity of the motor car battery is available for the starting operation.

Hence, the invention substantially improves, in a simple manner and by means of simple circuiting steps, the monitoring and controlling of the pressure in the auxiliary pressure supply system of a brake arrangement. With an intact brake system, even under adverse conditions, the time interval between opening of the driver's door and starting of the motor will be sufficient for loading the hydraulic reservoir such that after activation of the ignition, the brake warning lamp will not light up or, at best, for a few seconds only. The driver can, therefore, take off with no need for allowing for an inconvenient answering interval. Disconcertion caused by the illumination of the brake warning lamp serving to indicate defective conditions will be eliminated altogether or occur at particularly adverse conditions only. The added costs for the additionally required components, are at a minimum. The relays employed in the system as described can be replaced by hardware-implemented or programmable electronic circuits. If such circuits are already available on the vehicle, they can be equally employed for the performance of the functions described.

What is claimed is:

1. A circuit arrangement for monitoring and controlling the pressure in the auxiliary pressure supply system of a hydraulic motor car brake system which is furnished with a pressure accumulator and a hydraulic pump driven by electromotive force, activated and deactivated in response to pressure, and provided with telltale pressure circuit indicating the drop of the auxiliary pressure to below a predetermined telltale pressure threshold lower than the operating pressure range, said arrangement comprising a door-contact switch (24) closing during opening of the driver's door of the motor car and activating the hydraulic pump (11) at a pressure in the auxiliary pressure supply system (11-16) below the predetermined telltale threshold wherein said door contact (24), directly or by way of an auxiliary relay (25), drives a motor actuating relay (29) connected in series with pressure switch (17) which, in operating condition, activates and deactivates the hydraulic pump (11) pressure-responsively and wherein said door contact (24) is connected in series with a contact (19) of the telltale pressure circuit (18), closing when the pressure drops below the telltale threshold.

2. A circuit arrangement according to claim 1, further comprising a holding circuit (contact 26, diode D30) through which after closure of the driver's door and after opening of the door contact (24), respectively, the continued operation of the hydraulic pump (11) is maintained until a predetermined circuit threshold is reached.

3. A circuit arrangement according to claim 2, wherein the holding circuit comprises an auxiliary relay (25) connected in series with the door contact (24) and including a work contact (26) functionally connected in parallel to the door contact (24), by way of which work contact (26) the motor relay (29) can be actuated, and a holding current path (30).

4. A circuit arrangement according to claim 3, wherein the hydraulic pump (11) remains activated until a telltale pressure threshold has been reached.

5. A circuit arrangement according to claim 3, wherein the hydraulic pump (11) remains activated until a predetermined pressure level within the operating pressure range has been reached.

6. A circuit arrangement for monitoring and controlling the pressure in the auxiliary pressure supply system of a hydraulic motor car brake system which is furnished with a pressure accumulator and a hydraulic pump driven by electromotive force, activated and deactivated in response to pressure, and provided with telltale pressure circuit indicating the drop of the auxiliary pressure to below a predetermined telltale pressure threshold lower than the operating pressure range, said arrangement comprising a door-contact switch (24) closing during opening of the driver's door of the motor car and activating the hydraulic pump (11) at a pressure in the auxiliary pressure supply system (11-16) below the predetermined telltale threshold, and further comprising a holding circuit comprising a timer unit activated by one of opening or closing the driver's door or by actuating the door contact, by way of which holding circuit the hydraulic pump (11) remains activated for a predetermined period of time as long as the hydraulic pressure is below the maximum operating pressure.

7. A circuit arrangement according to claim 6 further comprising a switch (28) interrupting the activation of the hydraulic pump (11) during actuation of the starter.

* * * * *